Aug. 20, 1968 O. E. RITTENBACH 3,398,364

SPECTRUM ANALYZER HAVING MEANS FOR COMPARING THE FREQUENCY COMPONENTS OF A COMPLEX SIGNAL WITH A VARIABLE REFERENCE SIGNAL

Filed March 12, 1965

INVENTOR,
OTTO E. RITTENBACH.

BY: Harry M. Saragovitz, Edward J. Kelly, Herbert Berl & Julian C. Keppler
ATTORNEYS.

United States Patent Office 3,398,364

Patented Aug. 20, 1968

3,398,364

SPECTRUM ANALYZER HAVING MEANS FOR COMPARING THE FREQUENCY COMPONENTS OF A COMPLEX SIGNAL WITH A VARIABLE REFERENCE SIGNAL

Otto E. Rittenbach, Neptune, N.J., assignor to the United States of America as represented by the Secretary of the Army Filed Mar. 12, 1965, Ser. No. 439,487

6 Claims. (Cl. 324—77)

ABSTRACT OF THE DISCLOSURE

A spectrum analyzer for detecting and displaying the amount of energy contained in the various Fourier components of a complex signal. A variable filter, a variable oscillator and the horizontal deflection of a CRT are controlled by a sweep signal. The output frequency of the oscillator is equal to a frequency contained in the pass band of the filter. The signal to be analyzed is connected to the filter, the output of which is compared to the output of the oscillator such that when the frequency of the filter output is equal to the oscillator frequency and of the same phase a signal will be applied to the vertical deflection of the CRT. In a second embodiment the oscillator output is split into two channels and the signal in one channel is shifted ninety degrees. The output of the filter is compared to the oscillator in both channels and the resulting signals are added in quadrature. The sum signal is applied to the vertical deflection of the CRT to indicate the Fourier components of the input signal.

The invention described herein may be manufactured and used by or for the Government for governmental purposes, without the payment of any royalty thereon.

This invention relates to analysis of the various frequency components in the output of a receiver responsive to a band of a radiant energy or an original source involving such a band. It is particularly concerned with sharpening the selectivity of the analysis to rather precise frequency components. It is commonly applied to panoramic type analyzers, in which a sawtooth sweep control wave cyclically changes the frequency response while providing a corresponding frequency sweep on a cathode ray oscilloscope. Often such a sweep system provides adjustment of the sawtooth amplitude controlling the amount of frequency sweep and the bias controlling the center frequency. If the sawtooth amplitude is reduced to zero the only remaining frequency variation becomes essentially manual in nature. Ordinarily the frequency response depends mainly on a variable frequency reference oscillator under control of the sweep wave, producing a beat at some predetermined difference frequency, even substantially at zero frequency (D.C.), or a similar signal at a sum frequency, to identify the corresponding component of the signal analyzed.

The invention involves producing different phase components at the reference (or signal) frequency and obtaining more exact frequency discrimination by the use of certain combinations. In one case the reference is used to produce two components of opposite phase (or polarity), each added to the signal, or perhaps more easily analyzed as added and subtracted in like phase. Each combined wave is then used in a thermocouple or barretter circuit of rather long time constant and outputs are connected in opposition. This avoids introducing improper response due to harmonics or other additional frequencies and provides a net output corresponding to the product of the inputs, but excluding all except rather low frequency components. This provides good frequency definition, which can be still further extended by the operator in observing the stability of the output, thus recognizing frequency differences in small fractions of a cycle per second.

In another case the reference is used to produce components of orthogonal or quarter phase each added to the signal, for example in a diode mixer, producing beat frequencies also of orthogonal or quarter phase. These beat frequencies are then restored to a live phase, added, filtered to exclude other frequencies, detected, and used to identify the corresponding input signals. Alternatively these beat frequencies may be converted to a very low frequency in thermocouples or barretters and combined, in this case by adding, not in opposition. One might expect that the outputs of the two circuts at quarter phase would be much the same whenever the reference sweeps through the range. Actually either one may produce a considerably larger output than the other dependent on the particular phase relation during the sweep. By combining the two it is possible to obtain a much more reliable indication of the actual ampltude of the signal frequency components. The mathematical analysis to show this appears in a German text by Kuepfmueller, K., Die Systemtheorie der electrischen Nachrichtenuebertragung, Zurich, Switzerland, S. Hirzel, 1949, pp. 122–131.

It is an object of this invention in spectrum analysis to improve the ratio of the frequency scanning rate in cycles per second per second to the bandwidth resolution in cycles per second. This scanning rate may be readily recognized as an acceleration in early rotary signal generators, although rather obscure in modern electronic signal generators. Other objects will be apparent from the following further description, claims, and drawings, in which:

Figure 1A:
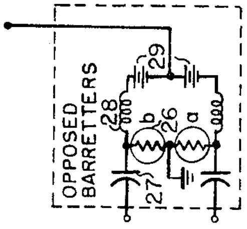
FIG. 1A shows an alternative barretter circuit to replace the thermocouple portion of FIG. 1.
Figure 1:
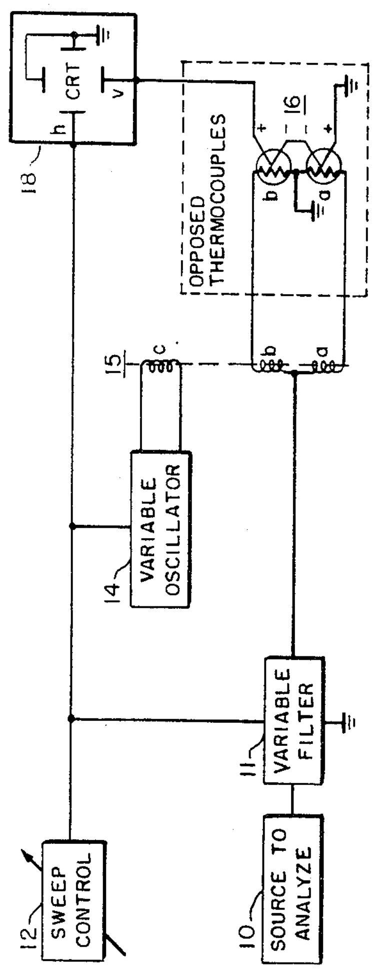
FIG. 1 shows one form of the invention with the reference providing two components of opposite phase, each added to the signal, using thermocouples for each combined signal.

In FIG. 1 a source to be analyzed 10 is connected to a filter 11 varied by sweep control 12 to provide signal components close to the range of interest. A ground reference terminal is shown on filter 11. An oscillator 14 also varied by the sweep control 12, provides a precise reference to determine the exact frequency response. The signal is added to two reverse phase components provided by the reference in a simple phase splitting transformer 15, with the signal connected to the center tap of series connected secondary windings *a* and *b*, and the reference connected to the primary winding *c*.

Each of the combined outputs is connected to corresponding inputs of thermocouples 16*a* and *b* having a common ground for the inputs, and outputs in opposition. The characteristic of thermocouples is such that the output voltage is substantially equal to the square of the input current, but due to the long time constant the effect must be integrated over a corresponding time, eliminating all high frequency components. In the numerical sense the inputs may be considered as: $+E_s \sin W_s t$, $+E_r \sin W_r t$, and $-E_r \sin W_r t$, in which case the difference of the two squares, omiting the sum frequency component, leaves merely: $2E_s E_r \cos (W_s - W_r)t$. This opposed output is applied to the vertical deflection input of a cathode ray oscilloscope 18. Because of a very wide signal amplitude range a logarithmic amplifier would normally be used to provide legible readings at small and large amplitudes, and to bring the thermocouple output to an appropriate range for the deflection circuits. Any required amplification is merely assumed, and omitted from the drawing for reasons of simplicity. The sweep control 12 is connected to the horizontal deflection plates of the oscilloscope.

In FIG. 1A barretters 26*a* and *b* are used instead of thermocouples. The resistance of most elements varies with temperature. In barretters this effect is used to determine the temperature due to a heating current—in this case RF—by a measuring current—in this case D.C. The capacitors 27*a* and *b* pass RF to barretter elements but exclude D.C. while the chokes 28*a* and *b* exclude RF but pass D.C. Source 29 shown as a center tapped battery provides a simple bridge effect to determine the temperature difference in the two barretter elements. In this case the grounded common terminal of the elements provides the connection to the RF ground at filter 11 and also serves as the reference point in the D.C. path, so that the battery 29 center tap varies in potential according to the temperature difference of the barretter elements. This center tap is to be connected to the vertical deflection as in FIG. 1.

Figure 2B:
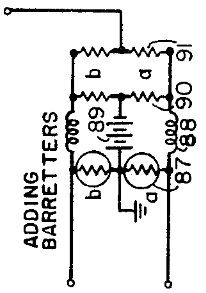
FIG. 2A and 2B show alternative thermocouple and barretter circuits to accomplish the recombination in FIG. 2.
Figure 2A:
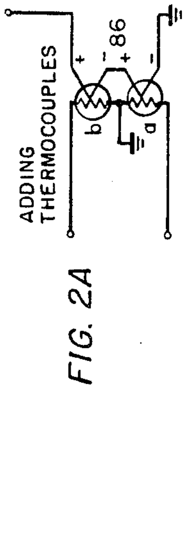
Figure 2:
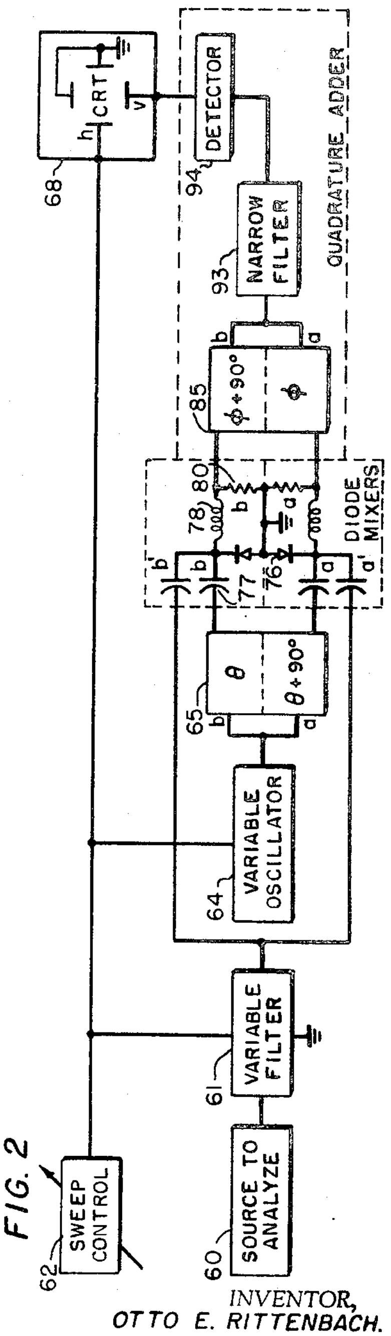
FIG. 2 shows another form with the reference providing two components at quarter phase also each combined with the signal, then both resultants recombined.

FIG. 2 involves various components substantially equivalent to those of FIG. 1, especially source 60, filter 61, control 62, oscillator 64, and oscilloscope 68. In this case the reference is used to produce two components at quarter phase. This is conveniently provided by RF circuits as described by R. B. Dome, wideband Phase Shift Networks, Electronics, v. 19, December 1946, p. 112. In this case also a simple way of combining reference and signal is shown in the form of parallel inputs through capacitors 77*a, a', b, b'*, to diodes 76*a* and *b*. This is most readily observed as adding currents, rather than voltages as in FIG. 1, but with equivalent effect. The diodes provide D.C. and low frequency output components both of which pass the chokes 78*a* and *b*; the resistors 80*a* and *b* pass the D.C. components, while the low frequency components are used as outputs in the quadrature adder network including further circuits as described by Dome, designed for the low frequency, and in this case connected to combine signals at quarter phase into a single output. This output is supplied to a narrow filter 93 which determines the selectivity then through a detector 94 to the vertical deflection of oscilloscope 68. In this case the filter 93 is tuned to the desired difference frequency and the filter 61 performs an additional function in avoiding outputs due to "image" frequencies, a situation also recognized in superheterodyne receiver design.

Although a low difference frequency has been assumed, it would also be possible to operate at a rather high difference frequency, or at the sum frequency instead. In these cases the chokes and capacitors would be arranged for the particular frequencies used.

FIG. 2A involves a different form of quadrature adder using two thermocouples 86*a* and *b* connected in additive relation, to be operated mainly when signal and reference are of substantial identical frequency. In this case the thermocouples provide the filter action.

FIG. 2B involves a similar operation using barretters 87*a* and *b*, somewhat as in FIG. 1A. However, because of the additive relation the circuit does not use a bridge type of output. Instead a single battery 89 connected through load resistors 90*a* and *b* and chokes 88*a* and *b* provides outputs which may be added through resistors 91*a* and *b*.

Typical applications of the invention have been shown, and others will be apparent to those skilled in the art.

What is claimed is:

1. A spectrum analyzer comprising a variable filter; means for connecting an input signal source to said filter; a variable reference signal source; sweep means for varying, over a predetermined frequency range, the output frequency of said reference signal source and for simultaneously varying, over said predetermined frequency range, the pass band of said filter, such that said filter is tuned to and tracks said reference signal output frequency; means for comparing the output of said filter with said reference signal source to provide a final output signal which is a function of the amount of energy contained in the output of said filter.

2. The device according to claim 1 and wherein said last mentioned means comprises phase splitting means for adding and subtracting said reference signal to the output of said filter to provide sum and difference signals; and means for squaring each said sum and difference signals and subtracting the squared signals from each other to provide said final output signal when said reference signal and said output of said filter are substantially in phase.

3. The device according to claim 2 and further including display means connected to said sweep means and said means for squaring for displaying said final output signals as a function of frequency.

4. The device according to claim 1 and wherein said means for comparing compares the output of said filter with quadrature components of said reference signal source.

5. The device according to claim 4 and wherein said means for comparing comprises means for splitting the output of said reference signal source into two channels which contain signals in quadrature; means for adding said output of said filter to the signal in each said channel to form first and second sum signals; means in each said channel for squaring each said sum signal; and a quadrature adder means for combining in quadrature the signals in each said channel.

6. The device according to claim 5 and further including display means connected to said sweep means and said quadrature adder means for displaying the amount of energy on the output of said filter as a function of said reference frequency.

References Cited

UNITED STATES PATENTS

| | | | |
|---|---|---|---|
| 2,854,191 | 9/1958 | Raisbeck | 324—77 |
| 2,941,148 | 6/1960 | Catheral | 324—106 |
| 2,976,408 | 3/1961 | Colaguori | 324—77 |
| 3,012,200 | 12/1961 | Hurvitz | 324—79 |
| 3,020,477 | 2/1962 | Lewinstein | 324—77 |
| 3,153,192 | 10/1964 | Pidhayny et al. | 324—77 |
| 3,182,256 | 5/1965 | Andrew | 324—77 |
| 3,197,625 | 7/1965 | Ratz | 324—77 |
| 3,045,180 | 7/1962 | Losher | 324—77 |
| 3,241,059 | 3/1966 | Wu | 324—77 |

RUDOLPH V. ROLINEC, *Primary Examiner.*

P. F. WILLE, *Assistant Examiner.*